2 Sheets—Sheet 1.
J. HAINES.
Harvester.
No. 2,997. Reissued June 23, 1868.
Fig. 1,
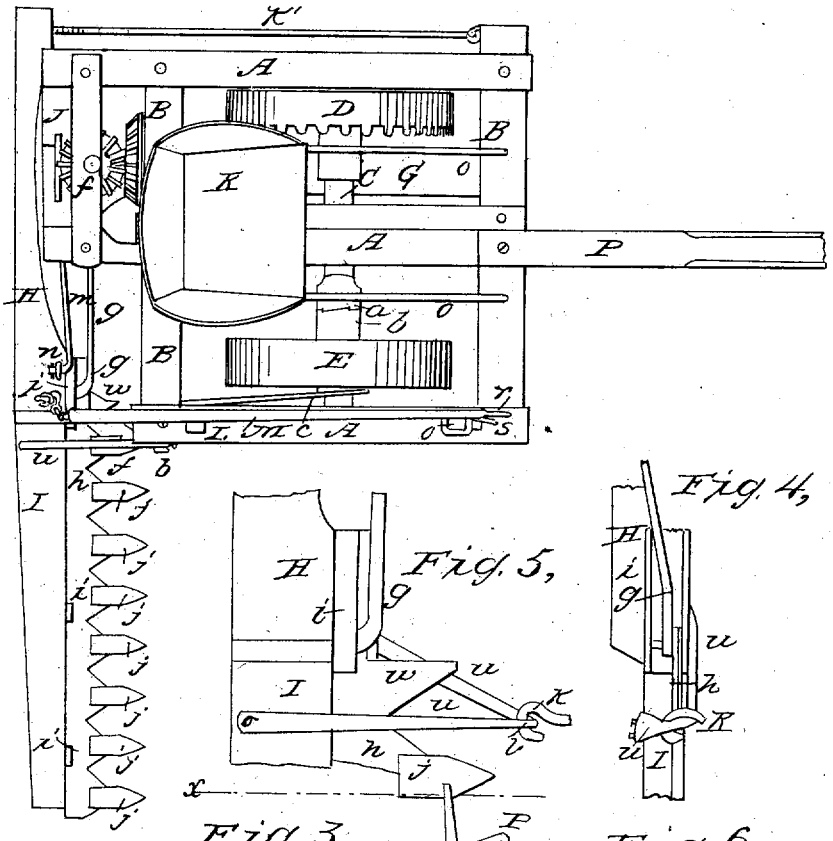
Fig. 4,
Fig. 5,
Fig. 3,
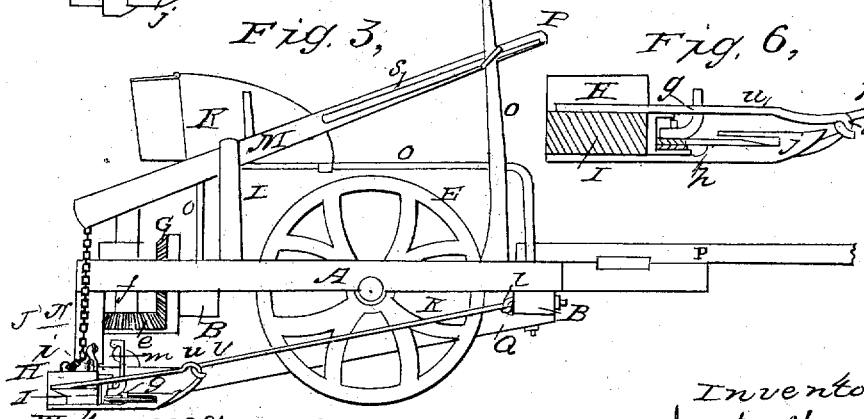
Fig. 6,
Witnesses:
Philip C. Dieterich
Thos. J. Pickles
Inventor:
Jonathan Haines
By his atty
R. D. O'Neill
N. PETERS, Photo-Lithographer, Washington, D. C.

J. HAINES.
Harvester.
No. 2,997. Reissued June 23, 1868.
Fig. 2,
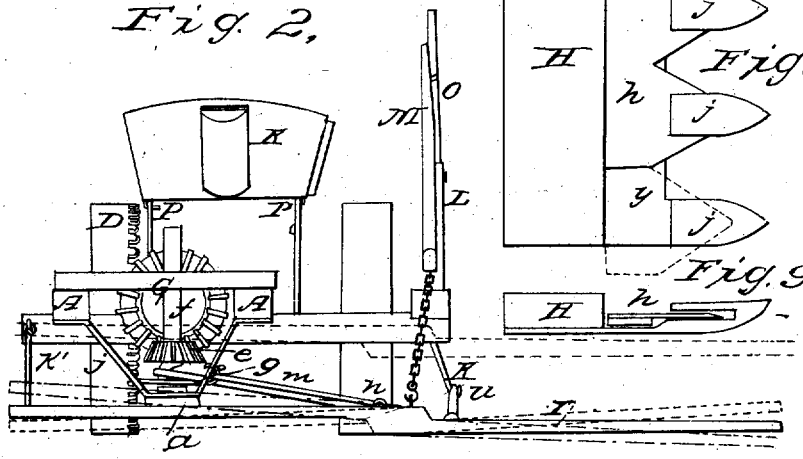
Fig. 8,
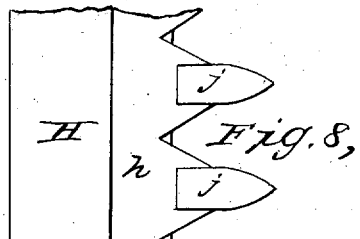
Fig. 9,
Fig. 4,
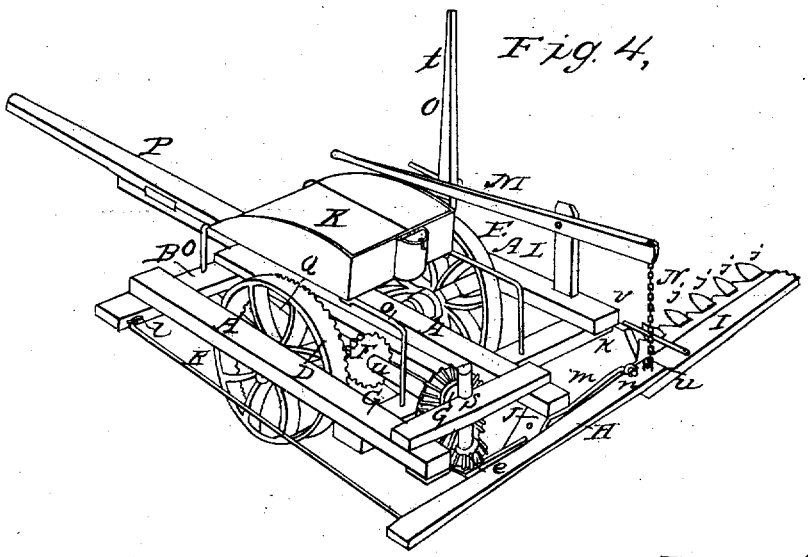
Witnesses:
Philip C. Dietrich
Thos. J. Parker
Inventor
Jonathan Haines
By his atty
R. D. Smith
N. PETERS, Photo-Lithographer, Washington, D. C.

UNITED STATES PATENT OFFICE.

JONATHAN HAINES, OF PEKIN, ILLINOIS, ASSIGNEE, BY MESNE ASSIGNMENTS, OF HIMSELF; (JAMES HAINES, OF TAZEWELL COUNTY, ILLINOIS, ADMINISTRATOR.)

IMPROVEMENT IN GRASS-HARVESTERS.

Specification forming part of Letters Patent No. 13,523, dated September 4, 1855; reissue No. 545, dated April 13, 1858; reissue No. 2,997, dated June 23, 1868.

DIVISION B.

*To all whom it may concern:*

Be it known that I, JONATHAN HAINES, of Perkin, in the county of Tazewell and State of Illinois, did invent new and useful Improvements in Grass-Harvesters; and I do hereby declare the following to be a full, clear, and exact description of so much of said invention as is included in this patent, reference being had to the accompanying drawings, in which—

Figure 1 is a plan of my machine. Fig. 2 is a rear elevation of the same. Fig. 3 is a side elevation of the same. Fig. 4 is a perspective view, looking from the rear. Fig. 5 is an enlarged plan of the inner end of the cutting apparatus. Fig. 6 is a sectional elevation on line X X of Fig. 5. Fig. 7 is a front elevation of the inner end of the cutting apparatus, enlarged. Fig. 8 is an enlarged plan of the outer end of the cutting apparatus. Fig. 9 is an end elevation of the same.

My invention relates to that class of grass-harvesters having two driving and supporting wheels, which carry the main frame, and the gearing which drives the cutters, and a laterally-projecting cutting apparatus flexibly connected to the main frame.

That others may understand the construction and operation of this part of my invention I will particularly describe it.

A finger-beam has heretofore been hinged to the frame of a harvesting-machine, but so hinged that the heel of said beam could not be raised without raising to a greater extent the point or other end thereof also. The objection to such a hinged beam is obvious, viz: that if any portion of the finger-beam rises to pass over an obstruction it will, to a greater or less extent, raise up other portions with it that are unobstructed, and thus the cutting is imperfectly done.

A suitable main frame may be composed of the longitudinal pieces A A and transverse pieces B B, and this frame is supported on the journals of an axle, C, which carries the two wheels D E. One of the wheels, D, is fast on said axle so that they turn together, and the other one, E, is fast and loose, as circumstances may require, as follows: *a* is one part or half of a ratchet-clutch, which is fast on the axle C, the other part or half, *b*, of said clutch being formed on the inner part of the hub of the wheel E. *c* is a spring bearing against the outer side of the hub, on which one half of the clutch is formed, and holds it into gear with the fixed half *a*, the projections or teeth of the two parts forming the clutch being so made that, when the machine is drawn forward, both wheels revolve with the axle, and both become driving as well as supporting wheels; but, when the machine is being turned around, the turning being almost invariably toward the cutters, the wheel E becomes loose from the clutch, the inclined sides of the projections which form the clutch, slipping past each other, and then said wheel E turns on independent of said axle C, and thus facilitates the turning around of the machine. Both wheels D and E are, therefore, driving-wheels when the machine is cutting grain or grass, and besides the weight of the machine itself the weight of the driver is divided on the two wheels, and I thus avail myself of all the weight to throw friction on the driving-wheels, to prevent them from slipping. The wheel D is provided with cogs on the inner edge of its perimeter, which gear with the cogs of a pinion, F, on one end of the shaft *d*, and on the other end of this shaft *d* there is a bevel cog-wheel, G, which works into a pinion, *e*, on the vertical shaft *f*, and to a crank near the lower end of said shaft *f* is fastened one end of the rod *g*, the other end of said rod being connected to the heel of the cutter, to give said cutter a reciprocating motion in a straight line through the open slotted guard-fingers *j j*. The heel *h* of the cutter is confined to its proper working position by the guide-plate *i*, which is secured to the finger-beam, and is bent upward and forward so as to project over the heel, as shown in Figs. 5, 6, 7, and thus prevents any lift of the cutter at that end from its proper bed. This is of the utmost importance in a mowing-machine having a loose cutting apparatus which conforms to the surface of the ground, as mine does, because with every change in the horizontality of the cutting apparatus the line of draft of the pitman is relatively changed, and if it were not for the restraining action of the guide-plate *i* at every depression of the heel of the cutting apparatus, the cutter at that end would be raised from its seat and the edges would no longer shear the upper surface of the guard-fingers, but would pass clear above them and fail to cut the grass.

The finger-beam I and extension-bar H are united together by bolts passing through their adjoining ends. The beam I, to which the guard-fingers are rigidly attached, drags upon the ground when the machine is in operation, being hung loosely to the main frame by two rods, *k k'*, both of which rods, at their front ends, are hooked or looped into dead-eyes secured to the front transverse piece B of the main frame; the object of the loop and dead-eye fastening being that said rods may freely move up and down without restraint. The rear ends of these rods are differently connected to the finger beam and extension-bar; the one, *k*, is attached to said beam or to a bow or loop, *u*, attached to the beam by a joint, as at *v*, so that while said rod *k* may fully sustain the drag of the cutting apparatus it will not in any manner check or cramp the free movement of the same, as it rises and falls to adapt itself to the inequalities of the ground, or to pass over any intervening obstacle. The other rod, *k'*, though hinged with a fastening at its front end that is in effect like a universal joint, as dead-eyes or loop-fastenings are generally, has its rear end passed through the outer end of the extension-bar I, and held thereto by a screw or nut, so as to make that connection rigid to a very great degree. By thus hanging the cutting apparatus it is free to rise or fall with every elevation or depression on the surface of the ground, and can raise or lower at either one of its ends without raising or lowering its other end. This feature in grass-harvesting machines is particularly essential, as it does not leave so much ground unmown as when the finger-bar is simply hinged to the main frame, as theretofore done, so that, when raised at the heel, the point or other end would be raised to a greater extent. By my construction the cutting apparatus can rock upon the ground in the line of its length, and thus mount and pass over inequalities on the surface without raising the whole of said apparatus to do so. My finger-beam is a loose one, which adjusts itself at either end to the surface of the ground, and is uncontrolled in this particular by the main frame; but it is perfectly guided in its forward movement or path by its connection to said frame—or, in other words, while the said beam is free to rise or fall at either of its ends without communicating a similar movement to its other end, yet laterally it is as rigid and as readily controlled by the main frame as though it were a fixed, immovable part thereof. So also may the wheels of the main frame rise and fall with the inequalities of the ground, without communicating that motion to the finger-beam, for said beam adapts itself to the surface which it passes over without being influenced injuriously by the motion of the main frame; but at the same time the main frame directs and guides said beam in its forward motion, but not in its up and down movements, the latter being governed by the ground over which it is passing, and varying with the undulations of the same. While the two rods *k k'* sustain the drag of the finger-beam in its onward progress, they do not sustain the lateral tendency of said beam, though they may do so in part; and to prevent this lateral movement I use another bar, *m*, which is attached to a piece, J, (rigidly connected to the main frame,) by one of its ends and to the the heel of the finger-beam at *n* by its other end. The rod or bar *k* might more properly be called a drag-bar, and not a brace, though at times it may be either; but the rod or bar *k'* is rather a brace than a drag-bar, and, as a brace, might be rigid to a very great extent. The other rod, *m*, holds or braces just as the tendency of the finger-beam may be for the time being.

My cutter is what is commonly called a "short cutter," for the reason that its outer end is terminated with a cutting-section; and it has heretofore been common to place a blank section beyond the last cutting-section, for the purpose of removing the clogging matter which is forced into the slot of the divider by the last cutting-section. This blank, usually called a "clearer," was the same in form as the blank *w* at the inner end of my cutter. It is quite evident that the outer shoe or divider must be at least as wide as the length of the cutter's reciprocation when such a blank or clearer is used; because, not having any cutting-edges, if its point is entirely withdrawn from or projected beyond the edge of said divider while the machine is moving forward, standing grass will be caught by said point and drawn into the slot of the divider; and it is equally evident that a divider of such width will press the grass down very much in its passage, and that a narrower divider will press down the grass to a less extent.

When the blank is removed from the outer end of the cutter, an outer shoe or divider, much narrower than heretofore, may be used, even if no greater width than the width of the guard-fingers, which will not press the grass down to an inconvenient or objectionable extent. The use of such a narrow divider, having an open slot for the escape of the clogging matter, is of the highest importance in a mowing-machine, because the grass will be pressed down less, the cutter will sever it more nearly at a uniform distance from the ground, and the power required to draw the machine will be less. When a short cutter is used, it is necessary to insure the return of the outer section into and through the slot in the divider, when moving outward, by a guide, *y*, which connects the inner edge of the divider with the outer edge of the adjoining guard-finger, and placed so far forward that it will arrest and prevent the passage of any grass behind the cutting-edge or the end of the outer section. This is clearly shown in the drawings, Figs. 1 and 8.

The objects of these several parts being thus distinctly set forth, it will be obvious that their equivalents may be substituted for them, but so long as the object is attained by any of the ordinary well-known mechanical appliances, I should deem them as involving the general objects of my invention, viz., the application of the loose finger-beam to harvesters.

K is the driver's seat. It is connected to the supports of rails *o o*, which extend from front to rear of the frame, by loops *p p*, so that the driver may, without rising from his seat, and with the aid of his feet, move said seat forward or back, so that his weight may be used to balance the machine. This is very necessary in a harvester, the cutting apparatus of which rests upon the ground while in operation, and is supported upon the frame for transportation, because when the cutting apparatus is borne by the frame the weight of the driver must rest upon the opposite part of the said frame in order to counterbalance the weight of said cutting apparatus. A seat for the driver has been made susceptible of adjustment heretofore; but said seat when adjusted was permanent, being secured to the machine by bolts or their equivalents, and its position could only be changed by removing said bolts so that the seat might be detached entirely from the machine, replaced in its new position, and again secured; consequently the driver could not move himself forward or backward as the exigencies of the case might require; but by my arrangement the driver may aid the machine by shifting seat and weight forward or backward at any time when it may be necessary without removing said seat from its support.

To a standard, L, on the right-hand longitudinal piece A, is hung a lever, M, to the rear end of which is attached, by a chain or link, N, the finger-beam I, at or about its heel. By this lever and chain the cutting apparatus may be raised from the ground bodily by a simple movement of the driver's hand, to enable it to pass over obstructions or to raise the cutting apparatus for transportation. Near the front end of the lever M, which is provided with a handle, *r*, and a spring-catch, *s*, is an upright piece, *o*, supported by the frame of the machine, and provided with any suitable number of notches, *t*, into which the spring-catch *s* will drop when it is released from the hand of the driver.

P is a tongue or draft-pole centrally placed and rigidly connected to the frame and between the wheels, so as to place the horses as near the center of the line of draft as possible without being too near to the standing grass.

The stops *i' i'* are secured to the finger-beam at proper intervals and project over the back edge of the cutter-bar to retain it in proper working position, to sever the grass by shearing over the proper edges of the guard-fingers.

Q is a shield-brace extending from the front transverse piece B to the lower side of the bracket J. The position of this brace is such as to cause it to strengthen the said bracket, and, at the same time, act as a shield to protect the crank-shaft and bracket from contact with obstructions of any kind which may be upon the ground in the line of the machine's movement.

Having described my invention, what I claim as new, and desire to secure by Letters Patent, is—

1. In combination with a laterally-projecting finger-beam entirely unsupported at the outer end, and provided with open-slotted guard-fingers, through which and across said fingers the cutters are reciprocated in straight lines, a connecting-rod or brace-bar, *m*, having one end connected with and jointed to the heel of said finger-beam, and its other end flexibly connected with the main frame of the machine for the purpose of controlling the lateral movements of the finger-beam, so that the cutters and guard-fingers will be kept in unison with each other throughout the up and down movements of said finger-beam, independent of the main frame, substantially as set forth.

2. The drooping bracket J extending downward below the main frame, for the purpose of giving support to the crank-shaft, and to bring the crank and pitman more nearly in line with the cutters, substantially as set forth.

3. The shield-brace Q connected to the bracket J to protect the crank which drives the cutters while passing over cut grass and other obstructions, substantially as set forth.

4. Connecting the upper end of the brace or bar *m* to the bracket J, substantially as set forth.

5. The combination of the guide *y* with the short cutter *h* and open-slotted narrow divider *j*, when all are arranged for joint operation, substantially as set forth.

JONATHAN HAINES.

Witnesses:
R. D. O. SMITH,
EDM. F. BROWN.